(12) United States Patent
Chen et al.

(10) Patent No.: US 7,204,634 B2
(45) Date of Patent: Apr. 17, 2007

(54) BACKLIGHT MODULE

(75) Inventors: Chien-Hsiang Chen, Miao Li County (TW); Shi-Chi Hou, Miao Li County (TW)

(73) Assignee: Coretronic Corporation, Mio Li (TW)

( * ) Notice: Subject to any disclaimer, the term of this patent is extended or adjusted under 35 U.S.C. 154(b) by 0 days.

(21) Appl. No.: 11/254,321

(22) Filed: Oct. 19, 2005

(65) Prior Publication Data

US 2006/0139958 A1    Jun. 29, 2006

(30) Foreign Application Priority Data

Dec. 24, 2004    (CN) ................................ 093140516

(51) Int. Cl.
*F21V 7/04* (2006.01)

(52) U.S. Cl. ...................................... 362/616; 362/623

(58) Field of Classification Search ................. 362/616, 362/623
See application file for complete search history.

(56) References Cited

U.S. PATENT DOCUMENTS

| | | | |
|---|---|---|---|
| 6,669,350 B2 * | 12/2003 | Yamashita et al. | 362/612 |
| 6,896,386 B2 * | 5/2005 | Kitazawa et al. | 362/616 |
| 2003/0137821 A1 * | 7/2003 | Gotoh et al. | 362/31 |

FOREIGN PATENT DOCUMENTS

JP    2003005180 A  *  1/2003

* cited by examiner

*Primary Examiner*—Ali Alavi
*Assistant Examiner*—William I. Carter
(74) *Attorney, Agent, or Firm*—Darby & Darby

(57) ABSTRACT

A backlight module includes a light guide plate which has a first sidewall and two opposite second sidewalls extending transversely of the first sidewalls. The first and second sidewalls interconnect two opposite first and second faces. Alight source is disposed at one of the second sidewalls and projects light rays onto the first sidewall at an oblique angle. A first reflection layer is disposed over the first sidewall, and a second reflection layer is disposed over the second face. Total reflection of light into the light guide plate from the first sidewall and second face increases brightness and enhances evenness of brightness.

8 Claims, 3 Drawing Sheets

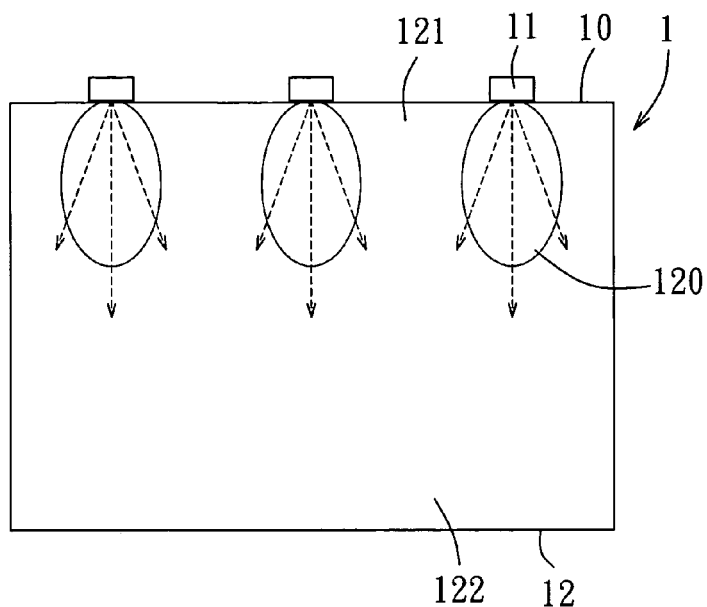
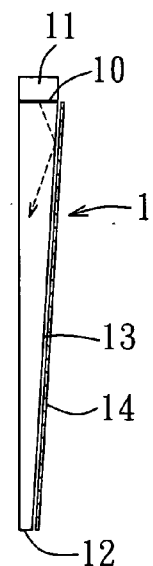
FIG. 1
PRIOR ART
FIG. 2
PRIOR ART
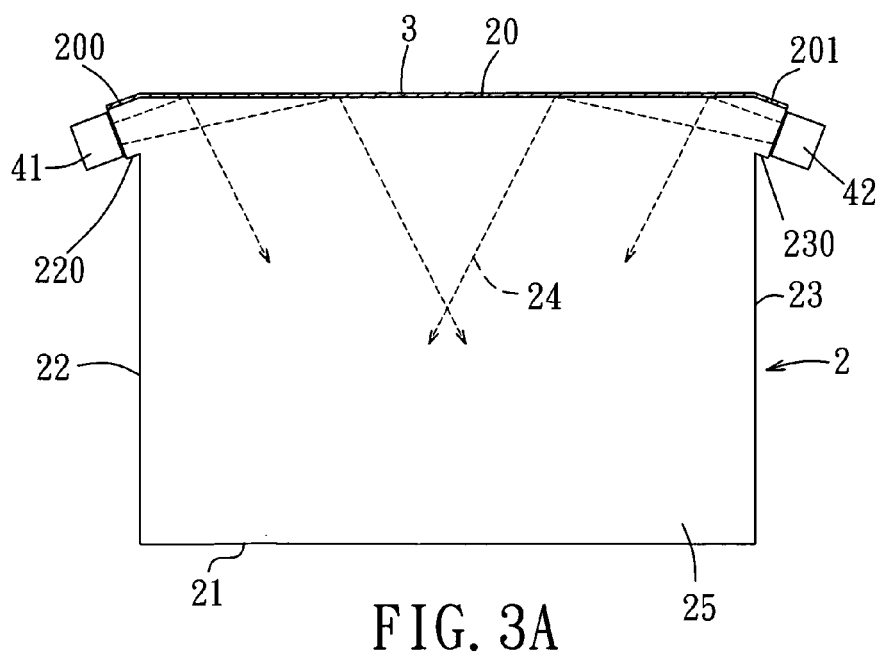
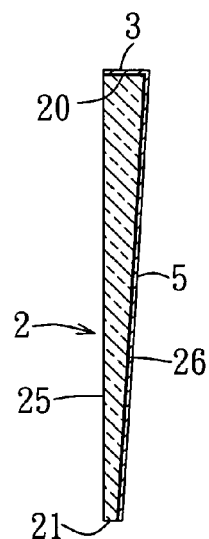
FIG. 3A
FIG. 3B

BACKLIGHT MODULE

CROSS-REFERENCE TO RELATED APPLICATION

This application claims priority from Taiwanese Patent Application No. 93140516, filed on Dec. 24, 2004.

BACKGROUND OF THE INVENTION

1. Field of the Invention

This invention relates to a backlight module, more particularly to a light guide plate of a backlight module.

2. Description of the Related Art

Backlight modules have been commonly used in display units of numerous electronic devices, such as mobile phones whose display units are generally used to display communication data or information. As shown in FIGS. 1 and 2, a conventional backlight module includes a light guide plate 1 and a plurality of spaced apart light source elements 11 disposed at one side 10 of the light guide plate 1. The thickness of the light guide plate 1 is tapered from the side 10 to the other side 12, and a reflection layer 14 is attached to one surface 13 of the light guide plate 1. The tapered configuration of the light guide plate 1 is used in an attempt to provide even brightness or avoid attenuation of light when light is reflected from the reflection layer 14. However, such a backlight module encounters a problem in that there are dark regions 121 between two adjacent bright regions 120 which are substantially elliptical and which extend in a direction toward the side 12 from the corresponding light source element 11 and that brightness tends to decrease from the side 10 toward the side 12. In order to provide backlight modules with even brightness, further improvements in backlight modules are desirable.

SUMMARY OF THE INVENTION

An object of the present invention is to provide a side light-type backlight module which is provided with increased light reflection area and uniform reflection of light.

According to one aspect of the present invention, a backlight module comprises: a light guide plate including opposite first and second faces, at least one first sidewall, and two opposite second sidewalls. The first and second sidewalls are connected to and extend between the first and second faces. The second sidewalls extend transversely at two opposite ends of the first sidewall. At least one light source is disposed proximate to at least one of the second sidewalls and projects light rays onto the first sidewall. A first reflection layer is disposed over the first sidewall for reflecting the light rays into the light guide plate.

According to another aspect of the present invention, a side-light backlight module comprises: a light guide plate including at least one first sidewall which is provided with a reflection layer, and two opposite second sidewalls perpendicular to said first sidewall; and at least one light sources disposed at one of the second sidewalls and projecting light rays onto the reflection layer along a direction oblique to the reflection layer, wherein the reflection area of the backlight module and uniformity of the reflected light may be enhanced through the pre-designed synchronous emission and projection of light onto the reflection layer by the light sources and through the reflection of light by the reflection layer.

BRIEF DESCRIPTION OF THE DRAWINGS

Other features and advantages of the present invention will become apparent in the following detailed description of the preferred embodiments of the invention, with reference to the accompanying drawings, in which:

FIG. 1 is a front view of a conventional backlight module;

FIG. 2 is a side view of the conventional backlight module;

FIG. 3A is a front view of the first preferred embodiment of the present invention;

FIG. 3B is a side view of the first preferred embodiment;

DETAILED DESCRIPTION OF THE PREFERRED EMBODIMENTS

Figure 4:
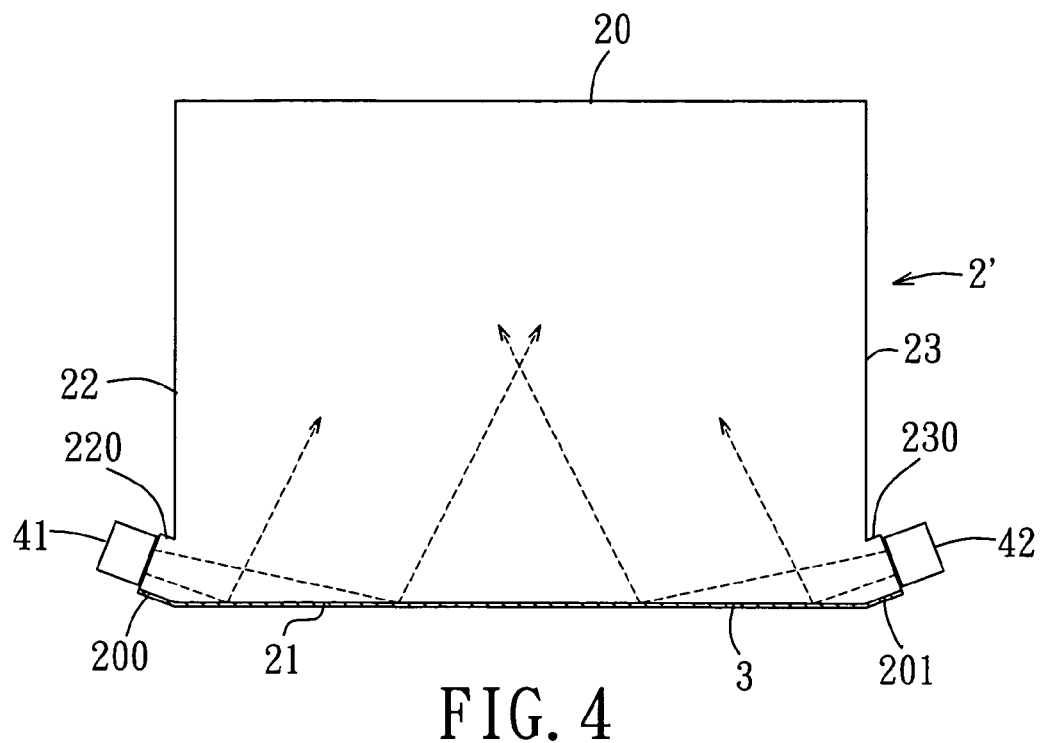
FIG. 4 is a front view of the second preferred embodiment of the present invention.

Before the present invention is described in greater detail, it should be noted that same reference numerals have been used to denote like elements throughout the specification.

Referring to FIGS. 3A and 3B, there is shown the first preferred embodiment of a side-light type backlight module according to the present invention which includes a light guide plate 2. The light guide plate 2 includes opposite first and second faces 25, 26 (i.e., front and back walls 25, 26), two opposite first sidewalls 20, 21 (i.e. top and bottom sidewalls 20, 21), and two opposed second sidewalls 22, 23 (i.e. left and right sidewalls 22, 23). The first or front face 25 is used as a light exit face. The first and second sidewalls 20, 21, 22, 23 are connected to and extend between the first and second faces 25, 26. The second sidewalls 22, 23 extend transversely of and interconnect the first sidewalls 20, 21. Preferably, the second sidewalls 22, 23 are perpendicular to the first sidewalls 20, 21. The thickness of the light guide plate 2 decreases from the first sidewall 20 to the other first sidewall 21.

The second sidewalls 22, 23 have upper left and right mounting protrusions 220, 230 proximate to the first sidewall 20. The first sidewall 20 has upper left and right guide walls 200 and 201 inclining downwardly and connected to the upper left and right mounting protrusions 220 and 230, respectively.

A light source 41 is disposed proximate to the left mounting protrusion 220, whereas the other light source 42 is disposed proximate to the right mounting protrusion 230. Preferably, light emitting diodes are used as the light sources 41, 42 in this embodiment. Each of the light sources 41, 42 is disposed in such a manner that it projects light rays onto the first sidewall 20 at an oblique angle. Preferably, the light rays are projected obliquely onto the first sidewall 20 at 30–45 degrees.

A reflection layer 3 is disposed over the first sidewall 20 to reflect the light rays into the light guide plate 2 and toward the other first sidewall 21. Another reflection layer 5 is disposed over the second face 26 to reflect the light rays toward the first face 25. The reflection layers 3 and 5 may be a silver or white reflection sheet. In this embodiment, silver foils are used in the reflection layers 3 and 5.

When the light sources 41, 42 emit and project light rays onto the first sidewall 20, the light rays 24 reflected from the first sidewall 20 are in turn reflected by the reflection layer 5 toward the first or front face 25. Due to total reflection in the light guide plate 2 from the first sidewall 20 and the second face 26, reflection surface area is increased and uniform brightness is achieved.

Figure 5:
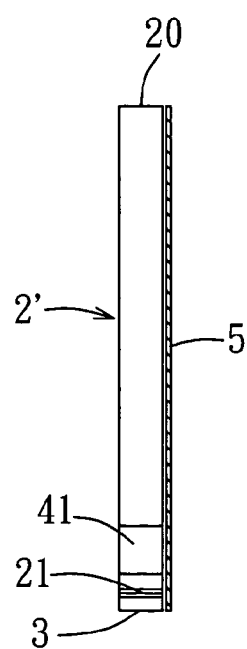
FIG. 5 is a side view of the second preferred embodiment.

Referring to FIGS. 4 and 5, there is shown the second preferred embodiment of the present invention which differs from the first preferred embodiment in that the reflection layer 3 in the light guide plate 2' is provided over the first sidewall 21, i.e. the bottom sidewall 21, rather than over the first or top sidewall 20, that lower left and right mounting protrusions 220 and 230 are formed at the respective second sidewalls 22, 23 proximate to the first or bottom sidewall 21, and that lower left and right guide walls 200, 201 are provided at two ends of the first or bottom sidewall 21. In addition, the light sources 41, 42 are mounted respectively on the lower left and right mounting protrusions 220 and 230. The light guide plate 2' has a uniform thickness.

Figure 6:
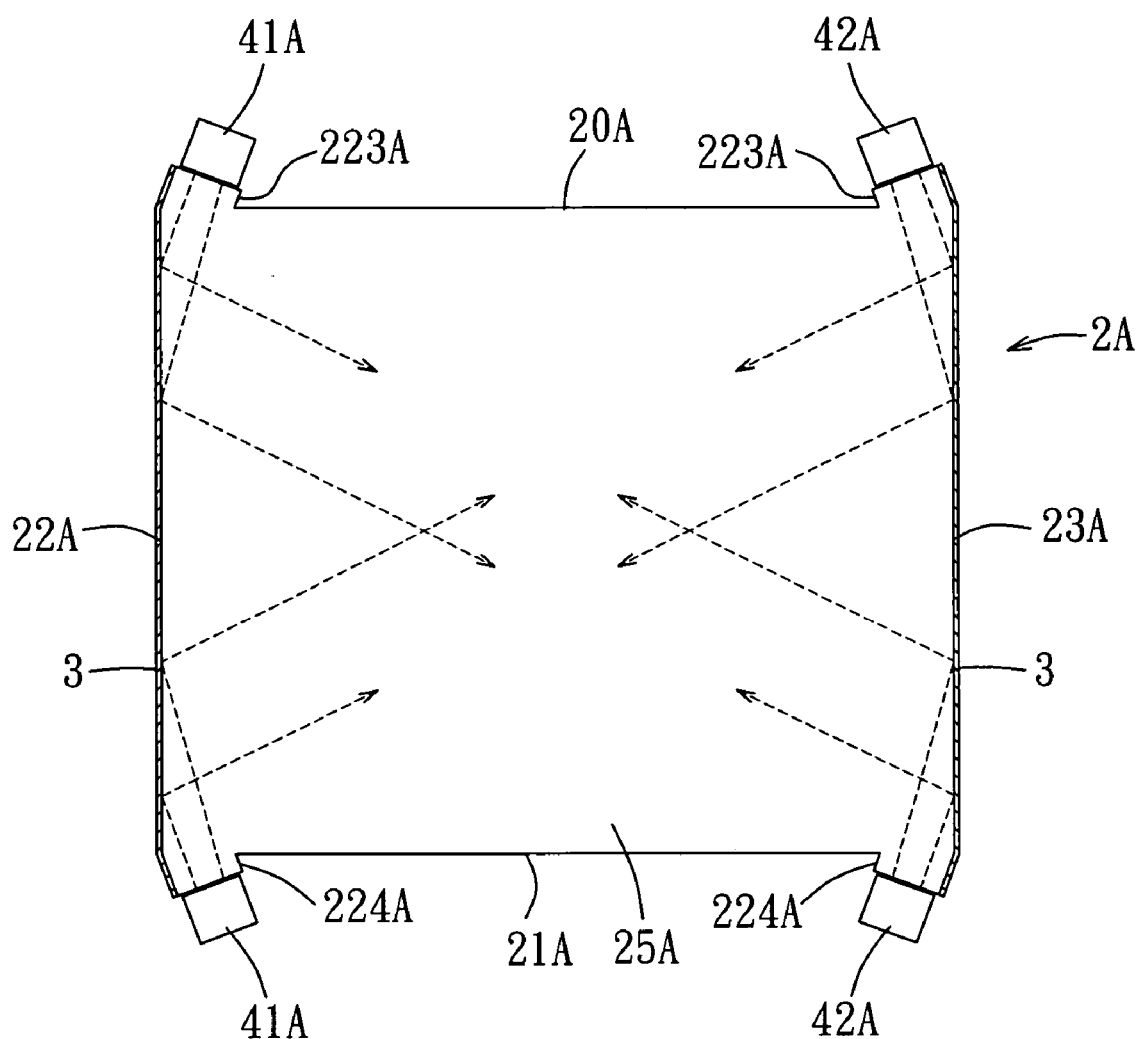
FIG. 6 is a front view of the third preferred embodiment of the present invention.

Referring to FIG. 6, the third preferred embodiment of the present invention is shown to include a light guide plate 2A. The light guide plate 2A includes a first face 25A, a second face (not shown) opposite to the first face 25A, two opposite first sidewalls 22A, 23A, and two opposite second sidewalls 20A, 21A. The first and second sidewalls 22A, 23A, 20A, 21A are connected to and extend between the first face 25A and the opposite second face (not shown). The first sidewalls 22A, 23A interconnect the second sidewalls 20A, 21A. The second sidewall 20A has two mounting protrusions 223A which are proximate to the first sidewalls 22A, 23A, respectively. The other second sidewall 21A has two mounting protrusions 224A which are proximate to the first sidewalls 22A, 23A, respectively. A pair of first light sources 41A are disposed respectively on one of the mounting protrusions 223A and one of the mounting protrusions 224A to project light rays onto the first sidewall 22A. A pair of second light sources 42A are disposed respectively on the other mounting protrusions 223A, 224A to project light rays onto the other first sidewall 23A. Two first reflection layers 3 are disposed respectively over the first sidewalls 22A, 23A to reflect the light rays into the light guide plate 2A. Due to the total reflection of light in the light guide plate 2A from the two first sidewalls 22A, 23A and the second or back face (not shown) of the light guide plate 2A, higher brightness with increased evenness can be achieved in this embodiment compared to the previous embodiments.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A backlight module comprising: a light guide plate including opposite first and second faces, a pair of opposite first sidewalls, and two opposite second sidewalls, said first and second sidewalls being connected to and extending between said first and second faces, said second sidewalls extending transversely at two opposite ends of said first sidewalls, said first sidewalls being connected between said second sidewalls; two pairs of light sources, said light sources in each pair being respectively disposed at said second sidewalls proximate to one of said first sidewalls, one pair of said light sources projecting light rays obliquely onto one of said first sidewalls, the other pair of said light sources projecting light rays obliquely onto the other one of said first sidewalls; and first reflection layers disposed respectively over said first sidewalls for reflecting the light rays projected onto said first sidewalls into said light guide plate.

2. The backlight module as claimed in claim 1, further comprising a second reflection layer disposed over said second face.

3. The backlight module as claimed in claim 1, wherein each of said second sidewalls has two mounting protrusions proximate to said first sidewalls, said light sources being disposed respectively on said mounting protrusions.

4. A side-light type backlight module comprising: a light guide plate including a top sidewall, a bottom sidewall, a left sidewall, a right sidewall, a back sidewall and a front wall, said left and right sidewalls being substantially perpendicular to said top or bottom sidewalls, said top sidewall having a reflection layer, said back wall having a reflection layer, said top sidewall having two opposite ends which incline downward to form upper left and right guide walls, respectively, said left and right sidewalls respectively having upper left and right mounting protrusions proximate to said top sidewall and connected respectively to said upper left and right guide walls, said reflection layer of said top sidewall being attached to said top sidewall and said upper left and right guide walls; and light sources mounted respectively on said upper left and right mounting protrusions and projecting light rays onto said reflection layer of said top sidewall along a direction oblique to said reflection layer of said topside wall, wherein the reflection area of the backlight module and uniformity of the reflected light may be enhanced through the pre-designed synchronous emission and projection of light onto the reflection layer by said light sources and through the reflection of light by said reflection layer.

5. The side-light type backlight module as claimed in claim 4, wherein each of said reflection layers of said backwall and said top sidewall includes a reflection sheet selected from the group consisting of a silver foil, a silver reflection sheet, and a white reflection sheet.

6. The side-light type backlight module as claimed in claim 4, wherein each of said light source includes at least one light emitting diode.

7. A side-light type backlight module comprising: a light guide plate including a top sidewall, a bottom sidewall, a left sidewall, a right sidewall, a backwall and a front wall, said left and right sidewalls being substantially perpendicular to said top or bottom sidewall, said backwall having reflection layer, said bottom sidewall having two opposite ends which incline upward to form lower left and right guide walls, respectively, said left and right sidewalls respectively having lower left and right mounting protrusions proximate to said bottom sidewall and connected respectively to said lower left and right guide walls, said bottom sidewall having a reflection layer attached to said bottom sidewall and said lower left and right guide walls; light sources mounted respectively on said lower left and right mounting protrusions and projecting light rays onto said reflection layer of said bottom sidewall along a direction oblique to said reflection layer of said bottom sidewall.

8. The side-light type backlight module as claimed in claim 7, wherein said top sidewall has two opposite ends which incline downward to form upper left and right guide walls, respectively, said left and right sidewalls further having respectively upper left and right mounting protrusions proximate to said top sidewall and connected respectively to said upper left and right guide walls, said top sidewall further having a reflection layer attached to said top sidewall and said upper left and right guide walls, the side-light type backlight module further comprising two additional light sources mounted respectively on said upper left and right mounting protrusions.

* * * * *

UNITED STATES PATENT AND TRADEMARK OFFICE
CERTIFICATE OF CORRECTION

PATENT NO. : 7,204,634 B2  Page 1 of 1
APPLICATION NO. : 11/254321
DATED : April 17, 2007
INVENTOR(S) : Chien-Hsiang Chen et al.

It is certified that error appears in the above-identified patent and that said Letters Patent is hereby corrected as shown below:

Title Page;
Item (73) in the assignee:
Please delete "Mio Li (TW)" and insert --Miao Li (TW)--

Signed and Sealed this

Twenty-sixth Day of June, 2007

JON W. DUDAS
*Director of the United States Patent and Trademark Office*